US010746284B2

United States Patent
Gmirya et al.

(10) Patent No.: US 10,746,284 B2
(45) Date of Patent: Aug. 18, 2020

(54) GEARBOX LUBRICATION SYSTEM FOR AIRCRAFT

(71) Applicant: SIKORSKY AIRCRAFT CORPORATION, Stratford, CT (US)

(72) Inventors: Yuriy Gmirya, Woodbridge, CT (US); Thomas L. Sbabo, Hamden, CT (US); John H. Meeson, Jr., Trumbull, CT (US); Rodger W. Bowman, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 271 days.

(21) Appl. No.: 15/566,310

(22) PCT Filed: Feb. 19, 2016

(86) PCT No.: PCT/US2016/018646
§ 371 (c)(1),
(2) Date: Oct. 13, 2017

(87) PCT Pub. No.: WO2016/171786
PCT Pub. Date: Oct. 27, 2016

(65) Prior Publication Data
US 2018/0106360 A1      Apr. 19, 2018

Related U.S. Application Data

(60) Provisional application No. 62/150,554, filed on Apr. 21, 2015.

(51) Int. Cl.
*F16H 57/04* (2010.01)
*B64C 27/12* (2006.01)

(52) U.S. Cl.
CPC ......... *F16H 57/0449* (2013.01); *B64C 27/12* (2013.01); *F16H 57/04* (2013.01);
(Continued)

(58) Field of Classification Search
CPC .. F16H 57/0449; F16H 57/04; F16H 57/0434; F16H 57/0435; F16H 57/0442;
(Continued)

(56) References Cited

U.S. PATENT DOCUMENTS 4,128,140 A * 12/1978 Riches ............... F01M 11/0458
184/1.5
4,373,421 A *  2/1983 Camboulives ............ F16N 7/32
184/6.12

(Continued)

OTHER PUBLICATIONS

PCT/US2016/018646—ISR/WO, dated May 27, 2016, 11 pages.

*Primary Examiner* — Michael A Riegelman
(74) *Attorney, Agent, or Firm* — Cantor Colburn LLP

(57) ABSTRACT

A gearbox for a rotary wing aircraft including a sump, a primary lubricant reservoir fluidically connected to the sump, one or more primary lubricant jets fluidically connected to the primary lubricant reservoir, an auxiliary lubricant reservoir fluidically connected to the sump, one or more auxiliary lubricant jets fluidically connected to the auxiliary lubricant reservoir, and at least one valve selectively fluidically connecting the sump and the primary lubricant reservoir based on a first lubricant pressure and the sump and the auxiliary lubricant reservoir based on a second lubricant pressure at the at least one valve.

12 Claims, 4 Drawing Sheets

(52) U.S. Cl.
CPC ..... *F16H 57/0434* (2013.01); *F16H 57/0435* (2013.01); *F16H 57/0442* (2013.01); *F16H 57/0452* (2013.01); *F16H 57/0456* (2013.01); *F16H 57/045* (2013.01); *F16H 57/0438* (2013.01)

(58) Field of Classification Search
CPC .. F16H 57/0452; F16H 57/0456; B64C 27/12
See application file for complete search history.

(56) References Cited

U.S. PATENT DOCUMENTS

| | | | | |
|---|---|---|---|---|
| 5,121,815 A * | 6/1992 | Francois | ................ | B64C 27/12 184/6.12 |
| 5,465,810 A * | 11/1995 | Peterson | ............ | C10M 177/00 184/6 |
| 6,390,240 B1 * | 5/2002 | Schmidt | ................ | F01M 11/04 123/196 S |
| 6,817,448 B2 * | 11/2004 | Maret | ................ | B64C 27/14 184/6.26 |
| 7,118,336 B2 * | 10/2006 | Waddleton | ............ | B64C 11/38 416/1 |
| 9,458,923 B2 * | 10/2016 | Poster | ................ | F16H 57/027 |
| 9,732,840 B2 * | 8/2017 | Harreau | ............ | F16H 57/0435 |
| 9,765,875 B2 * | 9/2017 | Sheridan | ............ | F16H 57/0482 |
| 10,393,313 B2 * | 8/2019 | Beier | ................ | F01D 25/20 |
| 10,415,692 B2 * | 9/2019 | Lapeyre | ............ | F16H 57/0435 |
| 2007/0261922 A1 * | 11/2007 | Mullen | ................ | B64C 27/14 184/6.12 |
| 2010/0025159 A1 * | 2/2010 | Gnnirya; Yuriy | ....... | B64C 27/12 184/6.4 |
| 2010/0294597 A1 * | 11/2010 | Parnin | ................ | F01D 25/18 184/6.1 |
| 2012/0222761 A1 * | 9/2012 | Poster | ................ | F16H 57/0456 137/563 |
| 2016/0208651 A1 * | 7/2016 | Dolman | ................ | F01D 25/20 |
| 2017/0175874 A1 * | 6/2017 | Schwarz | ............ | F16H 57/0435 |
| 2018/0073395 A1 * | 3/2018 | Parnin | ................ | F01D 15/12 |
| 2018/0106360 A1 * | 4/2018 | Gmirya | ................ | F16H 57/04 |

* cited by examiner

＝＝＝＝＝＝＝＝＝＝＝＝＝＝＝＝＝＝＝＝＝＝＝＝＝＝＝＝＝＝＝＝＝＝＝＝＝＝＝＝＝

GEARBOX LUBRICATION SYSTEM FOR AIRCRAFT

CROSS REFERENCE TO RELATED APPLICATIONS

This application is a National Stage application of PCT/US2016/018646, filed Feb. 19, 2016, which claims the benefit of U.S. Provisional Application Ser. No. 62/150,554, filed Apr. 21, 2015, both of which are incorporated by reference in their entirety herein.

STATEMENT OF FEDERAL SUPPORT

This invention was made with Government support under N00019-06-C-0081 awarded by the Navy. The Government has certain rights to the invention.

BACKGROUND OF THE INVENTION

Exemplary embodiments pertain to the art of aviation lubrication systems and, more particularly, to a gearbox lubrication system for an aircraft.

Various aircraft include a propulsion system coupled to a number of blades. In a fixed wing aircraft, the blades provide a forward momentum. In a rotary wing aircraft, the blades or rotors provide lift in addition to forward momentum. In many instances, the blades are connected to the propulsion system through a gearbox. Typically, the gearbox will include a lubrication system that distributes a lubricant onto various components. Loss of lubricant could result in a failure of the gearbox and, ultimately, a loss of momentum and/or lift that may lead to an unplanned landing.

BRIEF DESCRIPTION OF THE INVENTION

Disclosed is a gearbox lubrication system for an aircraft including a sump, a primary lubricant reservoir fluidically connected to the sump, one or more primary lubricant jets fluidically connected to the primary lubricant reservoir, an auxiliary lubricant reservoir fluidically connected to the sump, one or more auxiliary lubricant jets fluidically connected to the auxiliary lubricant reservoir, and at least one valve selectively fluidically connecting the sump and the primary lubricant reservoir based on a first lubricant pressure and the sump, and the auxiliary lubricant reservoir based on a second lubricant pressure at the at least one valve.

In addition to one or more of the features described above or below, or as an alternative, further embodiments could include wherein the auxiliary lubricant reservoir is selectively fluidically isolated from the primary lubricant reservoir.

In addition to one or more of the features described above or below, or as an alternative, further embodiments could include wherein the at least one valve comprises a shuttle valve.

In addition to one or more of the features described above or below, or as an alternative, further embodiments could include a bypass conduit fluidically connected to the primary lubricant reservoir and the sump downstream of the at least one valve.

In addition to one or more of the features described above or below, or as an alternative, further embodiments could include a pressure sensor fluidically connected between the primary lubricant reservoir and the one or more primary lubricant jets and operatively connected to the at least one valve.

In addition to one or more of the features described above or below, or as an alternative, further embodiments could include another pressure sensor fluidically connected between the auxiliary lubricant reservoir and the one or more auxiliary lubricant jets.

In addition to one or more of the features described above or below, or as an alternative, further embodiments could include wherein the gearbox lubrication system is mounted in a rotary wing aircraft.

Also disclosed is a method of lubricating a gearbox for an aircraft. The method includes directing lubricant from a sump to a primary lubricant reservoir, passing the lubricant from the primary lubricant reservoir to one or more primary lubricant jets onto one or more gearbox components, detecting a loss of lubricant pressure, operating a valve to direct the lubricant from the sump to an auxiliary lubricant reservoir and to prevent the lubricant from being directed to the primary lubricant reservoir, and passing the lubricant from the auxiliary lubricant reservoir to one or more auxiliary lubricant jets onto the one or more gearbox components.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
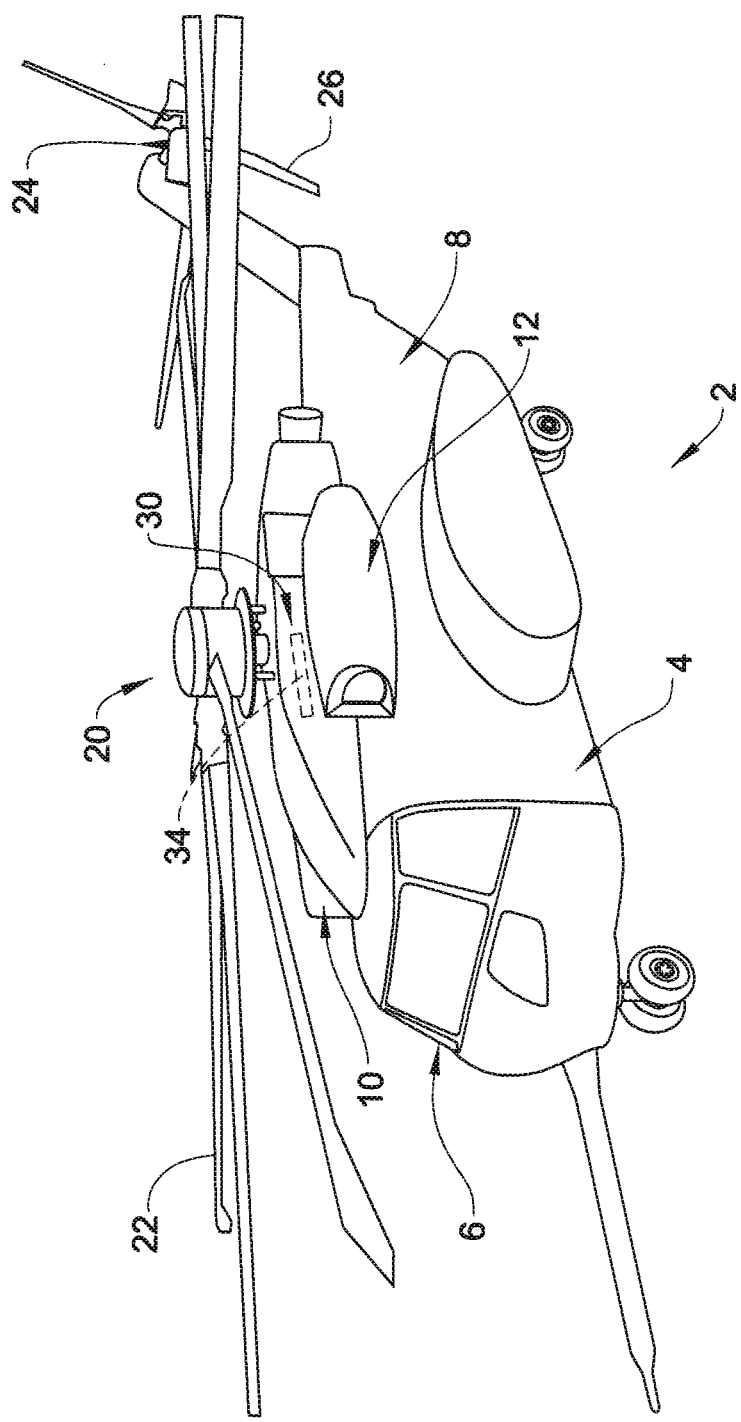
FIG. 1 depicts an aircraft, in the form of a rotary wing aircraft, including a gearbox lubrication system, in accordance with an exemplary embodiment.

An aircraft, in accordance with an exemplary embodiment, is indicated generally at 2, in FIG. 1. Aircraft 2 is shown in the form of a single rotor rotary wing aircraft. However, it should be understood that aircraft 2 may take on a variety of forms and configurations, including coaxial rotary wing aircraft, a fixed wing aircraft, tilt rotor aircraft, or other aircraft types. Aircraft 2 includes a fuselage 4 having a cockpit 6 and a crew compartment 8. Fuselage 4 supports a first propulsion system 10 and a second propulsion system 12. First and second propulsion systems 10 and 12 are operatively connected to a first rotor hub 20 having a first plurality of rotor blades 22 and a second rotor hub 24 having a second plurality of rotor blades 26. More specifically, a gearbox 30 having a gearbox lubrication system 34 operatively connects first and second propulsion systems 10 and 12 with first and second rotor hubs 20 and 24.

Figure 2:
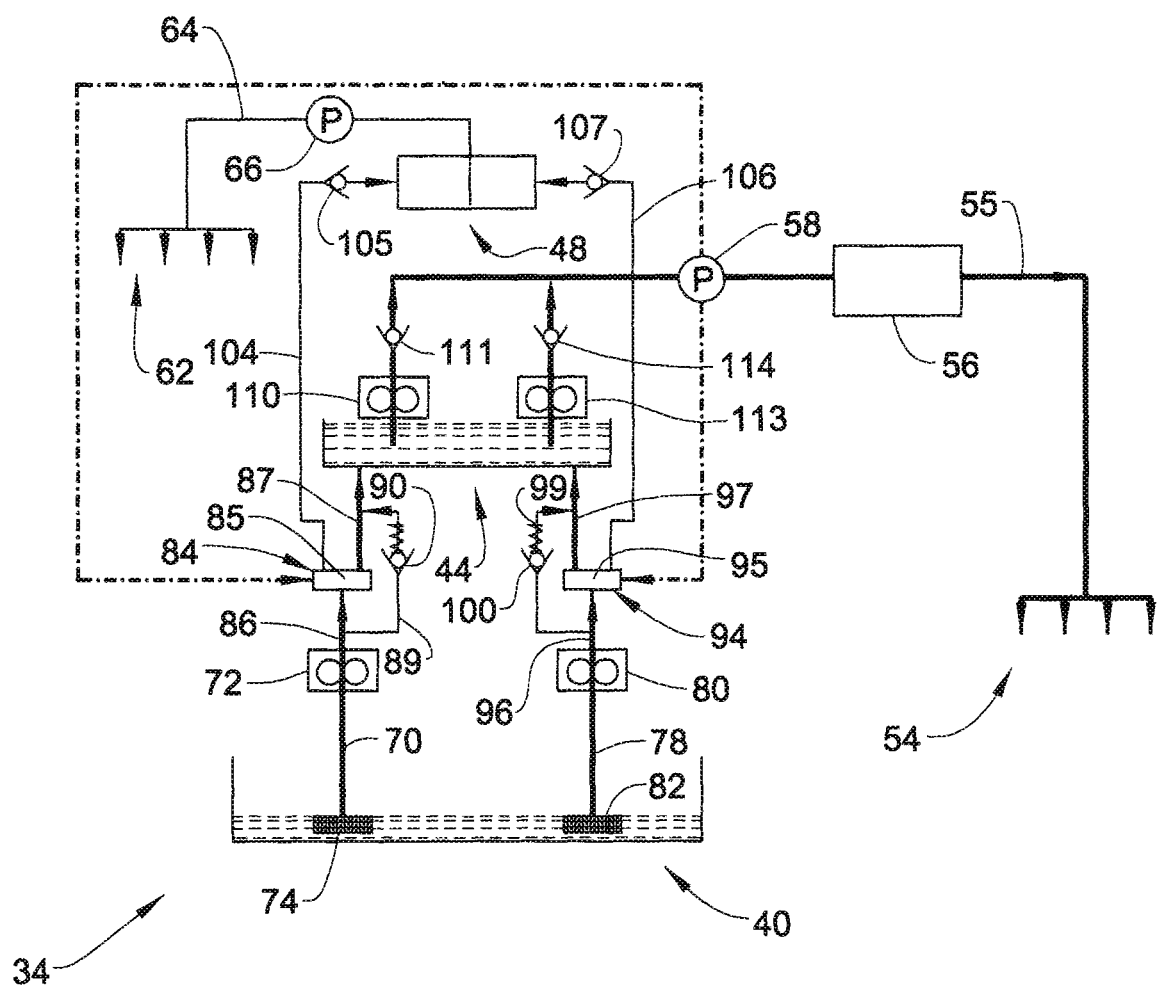
FIG. 2 is a schematic representation depicting normal operation of the gearbox lubrication system, in accordance with an exemplary embodiment.

Reference will now follow to FIG. 2 in describing gearbox lubrication system 34 in accordance with an exemplary embodiment. Gearbox lubrication system 34 includes a sump 40 selectively fluidically connected to a first or primary lubricant reservoir 44 and a second or auxiliary lubricant reservoir 48, as will be detailed more fully below. Primary lubricant reservoir 44 is fluidically connected to a plurality of primary lubricant jets 54 through a conduit 55. A lubricant filter 56 and a pressure sensor 58 may be fluidically connected to conduit 55 between primary lubricant reservoir 44 and primary lubricant jets 54. Auxiliary lubricant reservoir 48 is fluidically connected to a plurality of auxiliary lubricant jets 62 through a conduit 64. A pressure sensor 66 may be fluidically coupled to conduit 64. Pressure sensors 58 and 66 provide a pressure signal indicative of lubricant pressure passing to respective ones of primary lubricant jets 54 and auxiliary lubricant jets 62.

A first supply conduit 70 extends between sump 40 and a first lubricant pump 72. First supply conduit 70 is provided with a screen 74 in sump 40. A second supply conduit 78 extends from sump 40 to a second lubricant pump 80. Second supply conduit 78 is provided with a screen 82 in sump 40. A first valve 84, which may take the form of a shuttle valve 85, is fluidically connected to first lubricant pump 72 through a conduit 86. A conduit 87 fluidically connects first valve 84 and primary lubricant reservoir 44. A bypass conduit 89, having a pressure regulating valve 90, fluidically connects conduit 86 and conduit 87. A second valve 94, which may take the form of a shuttle valve 95, is fluidically connected to second lubricant pump 80 through a conduit 96. A conduit 97 fluidically connects second valve 94 and primary lubricant reservoir 44. A bypass conduit 99, having a pressure regulating valve 100, fluidically connects conduit 96 and conduit 97.

In further accordance with an exemplary embodiment, a first auxiliary supply conduit 104 fluidically connects first valve 84 and auxiliary lubricant reservoir 48. First auxiliary supply conduit 104 includes a check valve 105. A second auxiliary supply conduit 106 fluidically connects second valve 94 and auxiliary lubricant reservoir 48. Second auxiliary supply conduit 106 includes a check valve 107.

In still further accordance with an exemplary embodiment, a third lubricant pump 110 is provided at primary lubricant reservoir 44 and fluidically connected to conduit 55. A check valve 111 is arranged at an outlet (not separately labeled) of third lubricant pump 110. A fourth lubricant pump 113 is also fluidically connected between primary lubricant reservoir 44 and conduit 55. A check valve 114 is arranged at an outlet (also not separately labeled) of fourth lubricant pump 113. As will be detailed more fully below, lubrication pressure in gearbox lubrication system 34 may dictate a position of first and second valves 84 and 94 as well as pressure sensor 58. More specifically, actuation of first and second valves 84 and 94 may be based on lubricant pressure. Pressure differences experienced by first and second valves 84 and 94 control a particular flow path for the lubricant.

During normal operation, depicted in FIG. 2, lubricant passes from sump 40 to primary lubricant reservoir 44 through first and second valves 84 and 94. Very little, if any, flow will pass through bypass conduits 89 and 99 as lubricant pressure may not be sufficient to overcome pressure regulating valves 90 and 100. Lubricant is pumped into primary lubricant reservoir 44 from sump 40 by first and second lubricant pumps 72 and 80. First and second lubricant pumps 72 and 80 pump the lubricant at a high rate in order to maintain a low lubricant level in sump 40. In this manner, sump 40 may be considered a dry sump. During normal operation, first and second valves 84 and 94 direct lubricant to primary reservoir 44. From primary reservoir 44, third and fourth lubricant pumps 110 and 113 pump the lubricant through conduit 55 to primary lubricant jets 54. The lubricant is directed onto various components in gearbox 30 and passed back to sump 40. The lubricant passing through conduit 55 also passes by pressure sensor 58 and lubricant filter 56.

Figure 3:
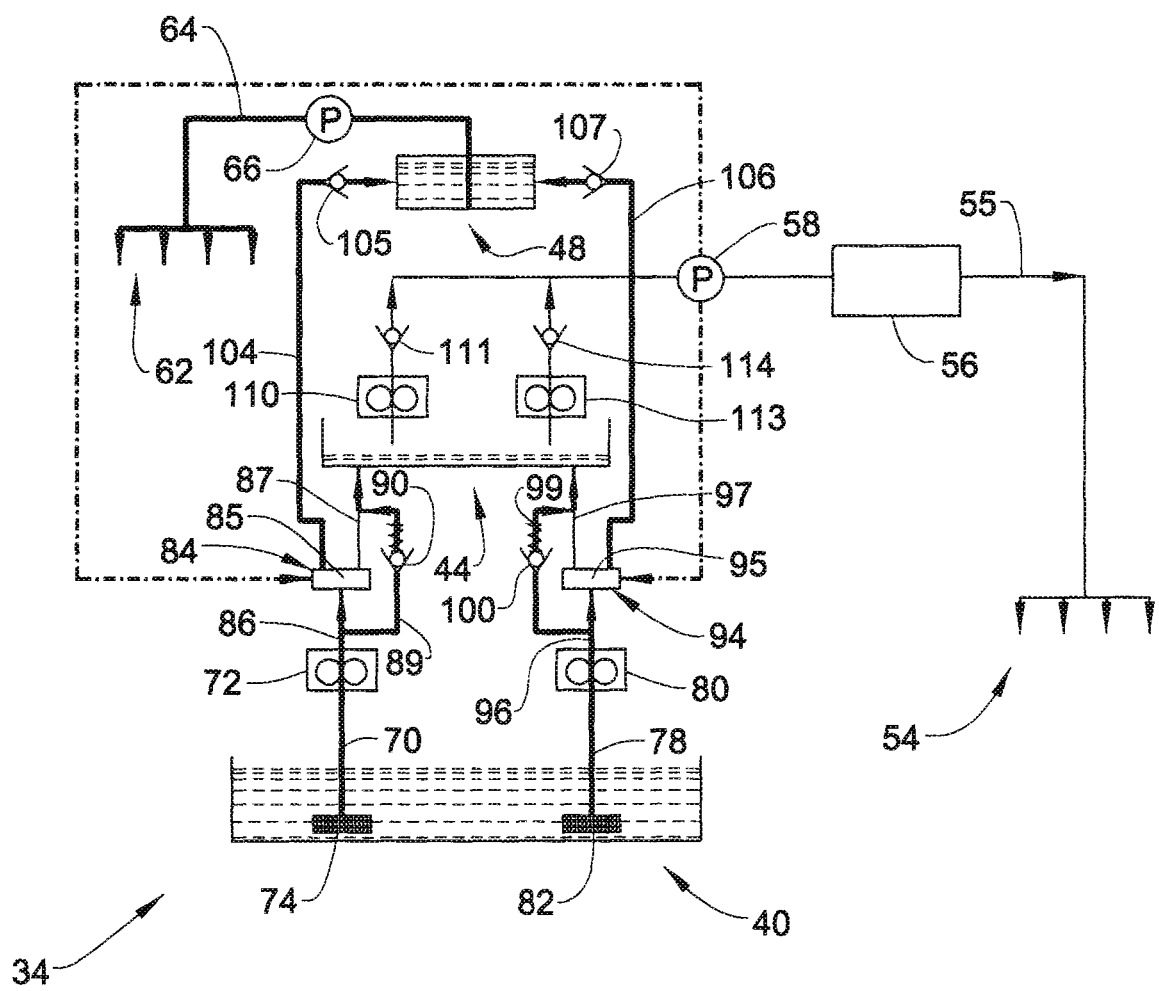
FIG. 3 is a schematic representation depicting startup operation of the gearbox lubrication system, in accordance with an exemplary embodiment.

Reference will now follow to FIG. 3, wherein like reference numbers represent corresponding parts in the respective views, in describing a startup operation of gearbox lubrication system 34. During startup, first and second lubricant pumps 72 and 80 direct lubricant from sump 40 through first and second valves 84 and 94 and directly to auxiliary lubricant reservoir 48. That is, during start up, lubricant pressure may not have risen to a level to shift first and second valves 84 and 94 to the second position. The lubricant flows from auxiliary lubricant reservoir 48 through auxiliary lubricant jets 62 onto components in gearbox 30 and back to sump 40.

When pressure in auxiliary lubricant reservoir 48 builds to a desired level, a portion of the lubricant flowing from first and second pumps 72 and 80 passes through first and second bypass conduits 89 and 99 to begin filling primary lubricant reservoir 44. In accordance with an aspect of an exemplary embodiment, about 30% of the fluid passing from sump 40 flows through first and second bypass conduits 89 and 99 into primary lubricant reservoir 44. Once the lubricant in primary lubricant reservoir 44 reaches a predetermined level, the lubricant covers intakes of pumps 110 and 113. At this point, lubricant begins to flow through conduit 55 and build pressure. When pressure in conduit 55 reaches a desired level, first and second valves 84 and 94 shift to fluidically isolate auxiliary lubricant reservoir 48. At this point, normal operation, as discussed above, begins.

Figure 4:
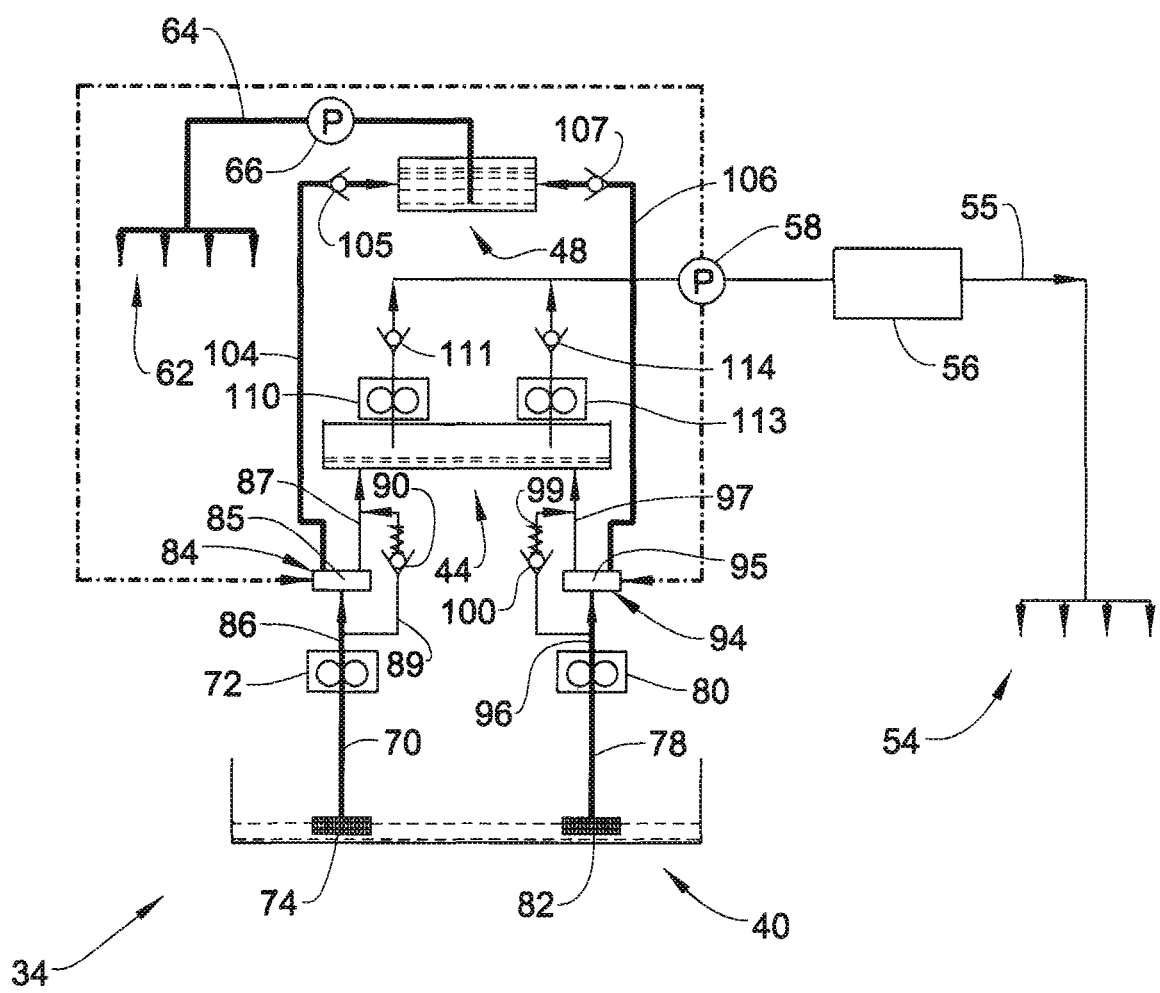
FIG. 4 is a schematic representation depicting emergency operation of the gearbox lubrication system, in accordance with an exemplary embodiment.

Gearbox lubrication system 34 may also operate in an emergency configuration, such as shown in FIG. 4 wherein like reference numbers represent corresponding parts in the respective views. Emergency operation may be desirable upon sensing a pressure loss at, for example, pressure sensor 58. Loss of pressure may occur for a number of reasons including mechanical failure or a ballistic penetration of gearbox 30. Under emergency operation, first and second lubricant pumps 72 and 80 continue to pump lubricant at a high rate in order to maintain a low lubricant level in sump 40. Continuing to maintain a dry sump ensures that lubricant loss remains low if sump 40 is damaged or is leaking. In the event of a penetration of sump 40 or other portion of gearbox lubrication system 34, an amount of lubricant is isolated from primary lubricant reservoir; and a portion of the lubricant remains in the system to facilitate emergency operation. The lubricant flowing through auxiliary lubricant jets 62 from auxiliary lubricant reservoir 48 provides pilots with time to reach a safe landing.

In further accordance with an exemplary embodiment, first and second valves 84 and 94 are biased back to the first position to direct lubricant from first and second lubricant pumps 72 and 80 directly to auxiliary lubricant reservoir 48. Under emergency operation, first and second valves 84 and 94 fluidically isolate primary lubricant reservoir 44 from sump 40 and auxiliary lubricant reservoir 48. Loss of pressure in lubrication system 34 may cause a shift to emergency operation. From auxiliary lubricant reservoir 48, the lubricant flows to auxiliary lubricant jets 62 through conduit 64. Conduit 64 and auxiliary lubricant jets 62 are independent of, and fluidically isolated from, conduit 55 and primary lubricant jets 54. In this manner, auxiliary lubricant jets 62 may continue to deliver lubricant to components in gearbox 30 in the event that lubricant may no longer flow to primary lubricant jets 54. At this point, it should be understood that while shown with parallel redundant systems, the gearbox lubrication system of the present invention may include a single system for delivering lubricant from primary lubricant reservoir 44 and/or auxiliary lubricant reservoir 48. It should also be understood that aspects of the invention need not use both sensors 58 and 66, and/or that the sensors 58 and 66 could be incorporated into other elements such as valves 84 and/or 89. Further, it should be understood that valves 84 and 94 may be operated by a controller based on inputs from, for example, pressure sensor 58.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The term "about" is intended to include the degree of error associated with measurement of the particular quantity based upon the equipment available at the time of filing the application. For example, "about" can include a range of ±8% or 5%, or 2% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. By way of example, aspects of the disclosure may be used in non-aerospace applications, including maritime, automotive, or industrial machinery where continuous lubrication is needed or desired. Therefore, it is intended that the invention not be limited to the particular embodiment disclosed as the best mode contemplated for carrying out this invention, but that the invention will include all embodiments falling within the scope of the claims.

What is claimed is:

1. A gearbox lubrication system for an aircraft comprising:
    a sump;
    a primary lubricant reservoir fluidically connected to the sump;
    one or more primary lubricant jets fluidically connected to the primary lubricant reservoir;
    an auxiliary lubricant reservoir fluidically connected to the sump;
    one or more auxiliary lubricant jets fluidically connected to the auxiliary lubricant reservoir; and
    at least one valve selectively fluidically connecting the sump and the primary lubricant reservoir based on a first lubricant pressure and the sump and the auxiliary lubricant reservoir based on a second lubricant pressure at the at least one valve, wherein the at least one valve directs lubricant from the sump into the auxiliary lubricant reservoir during a first operating phase of the aircraft and wherein the at least one valve directs lubricant from the sump to the primary lubricant reservoir during a second operating phase of the aircraft.

2. The gearbox lubrication system according to claim 1, wherein the auxiliary lubricant reservoir is selectively fluidically isolated from the primary lubricant reservoir.

3. The gearbox lubrication system according to claim 1, wherein the at least one valve comprises a shuttle valve.

4. The gearbox lubrication system according to claim 1, further comprising: a bypass conduit fluidically connected to the primary lubricant reservoir and the sump downstream of the at least one valve.

5. The gearbox lubrication system according to claim 1, further comprising: a pressure sensor fluidically connected between the primary lubricant reservoir and the one or more primary lubricant jets and operatively connected to the at least one valve.

6. The gearbox lubrication system according to claim 5, further comprising: another pressure sensor fluidically connected between the auxiliary lubricant reservoir and the one or more auxiliary lubricant jets.

7. The gearbox lubrication system according to claim 1, wherein the gearbox lubrication system is mounted in a rotary wing aircraft.

8. The gearbox lubrication system according to claim 1, wherein the at least one valve shifts from a first configuration, wherein the lubricant is passed from the sump into the auxiliary lubricant reservoir to a second configuration wherein the lubricant is passed from the sump to the primary lubricant reservoir once pressure in the auxiliary lubricant reservoir reaches a selected level.

9. The gearbox lubrication system according to claim 8, wherein the at least one valve shifts from the second configuration wherein the lubricant is passed from the sump to the primary lubricant reservoir to the first configuration wherein the lubricant is passed from the sump into the auxiliary lubricant reservoir once pressure in the primary lubricant reservoir drops below the selected level.

10. The gearbox lubrication system according to claim 1, further comprising:
    at least one pump fluidically connected between the sump and the at least one valve.

11. The gearbox lubrication system according to claim 10, wherein in an emergency operation mode, the at least one pump is operated to reduce an amount of lubricant in the sump.

12. The gearbox lubrication system according to claim 11, wherein in the emergency operation mode, the at least one valve fluidically isolates the primary lubricant reservoir and the auxiliary lubricant reservoir from the sump.

* * * * *